(12) United States Patent
Ichinose et al.

(10) Patent No.: US 11,749,854 B2
(45) Date of Patent: Sep. 5, 2023

(54) BATTERY COOLING STRUCTURE

(71) Applicant: TOYOTA JIDOSHA KABUSHIKI KAISHA, Aichi-ken (JP)

(72) Inventors: Kenichi Ichinose, Toyota (JP); Masayuki Yoshikawa, Toyota (JP); Hiroyuki Nishimura, Nagoya (JP); Kazuhisa Ori, Toyota (JP); Hidetoshi Katoh, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 112 days.

(21) Appl. No.: 17/099,607

(22) Filed: Nov. 16, 2020

(65) Prior Publication Data

US 2021/0218086 A1    Jul. 15, 2021

(30) Foreign Application Priority Data

Jan. 10, 2020    (JP) .................................. 2020-003223

(51) Int. Cl.

| H01M 10/6554 | (2014.01) |
| H01M 10/613 | (2014.01) |
| H01M 10/625 | (2014.01) |
| H01M 10/647 | (2014.01) |
| H01M 10/6556 | (2014.01) |
| H01M 50/507 | (2021.01) |
| H01M 50/502 | (2021.01) |
| H01M 50/20 | (2021.01) |

(52) U.S. Cl.
CPC ..... *H01M 10/6554* (2015.04); *H01M 10/613* (2015.04); *H01M 10/625* (2015.04); *H01M 10/647* (2015.04); *H01M 50/20* (2021.01); *H01M 50/502* (2021.01); *H01M 2220/20* (2013.01)

(58) Field of Classification Search
None
See application file for complete search history.

(56) References Cited

U.S. PATENT DOCUMENTS

2010/0255351 A1*  10/2010  Ijaz .................... H01M 50/503
                                                        429/7
2012/0189902 A1*   7/2012  Kim .................... H01M 50/291
                                                        429/159

(Continued)

FOREIGN PATENT DOCUMENTS

JP      H9-274904 A     10/1997
JP      2001-229901 A    8/2001
(Continued)

*Primary Examiner* — Lisa S Park
(74) *Attorney, Agent, or Firm* — HAUPTMAN HAM, LLP

(57) ABSTRACT

In a battery cooling structure for a vehicle, a battery including a plurality of cell groups arrayed in a vehicle body front-and-rear direction. Each cell group includes a plurality of cuboid cells that are arrayed in a thickness direction of the cells. Each cell includes a positive terminal provided at one side wall extending in a short side direction of the cell and a negative terminal provided at another side wall extending in the short side direction. The positive terminals of one of the cell groups and the negative terminals of another of the cell groups, which cell groups are adjacent in the vehicle body front-and-rear direction, oppose one another in plan view.

17 Claims, 15 Drawing Sheets

(56) References Cited

U.S. PATENT DOCUMENTS

| | | | |
|---|---|---|---|
| 2015/0086845 A1* | 3/2015 | Chang | H01M 50/502 |
| | | | 429/179 |
| 2015/0239719 A1 | 8/2015 | Oishi et al. | |
| 2016/0355100 A1* | 12/2016 | Ito | H01M 10/625 |
| 2017/0263910 A1 | 9/2017 | Kobayashi et al. | |
| 2017/0365887 A1 | 12/2017 | Kwon et al. | |
| 2019/0027721 A1* | 1/2019 | Yun | H01M 50/242 |
| 2020/0185687 A1 | 6/2020 | Kobayashi et al. | |
| 2020/0358152 A1 | 11/2020 | Shimizu et al. | |

FOREIGN PATENT DOCUMENTS

| | | |
|---|---|---|
| JP | 2006-19367 A | 1/2006 |
| JP | 2009158332 A | 7/2009 |
| JP | 201458242 A | 4/2014 |
| JP | 2017162631 A | 9/2017 |
| JP | 2017162632 A | 9/2017 |
| WO | 2019/146438 A1 | 8/2019 |

* cited by examiner

FIG.3
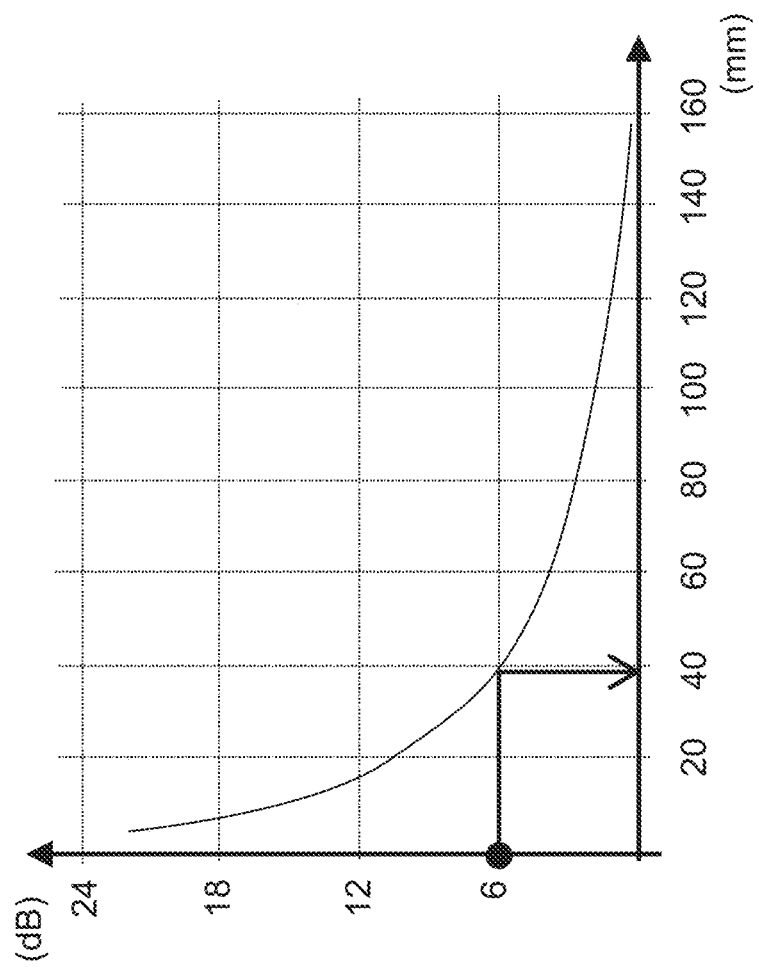
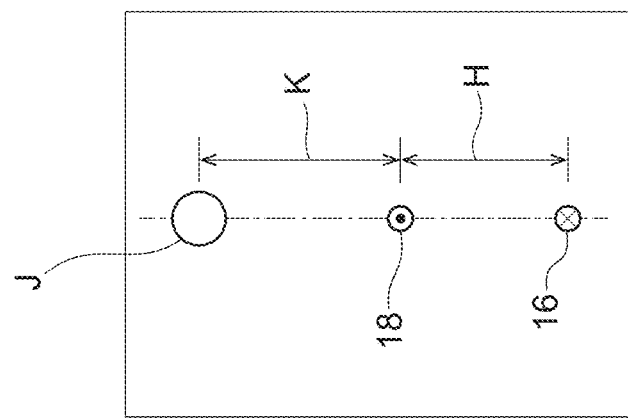

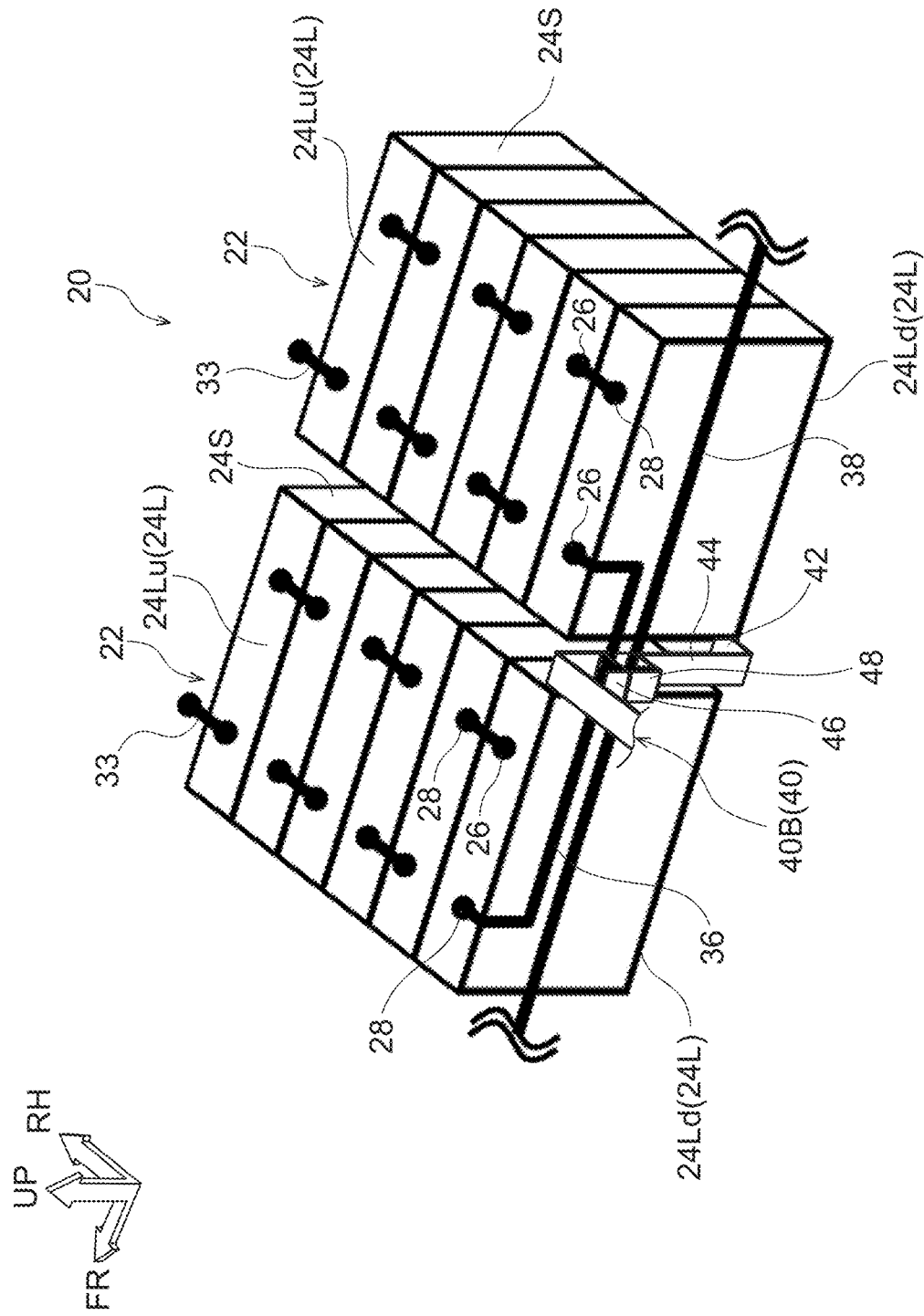

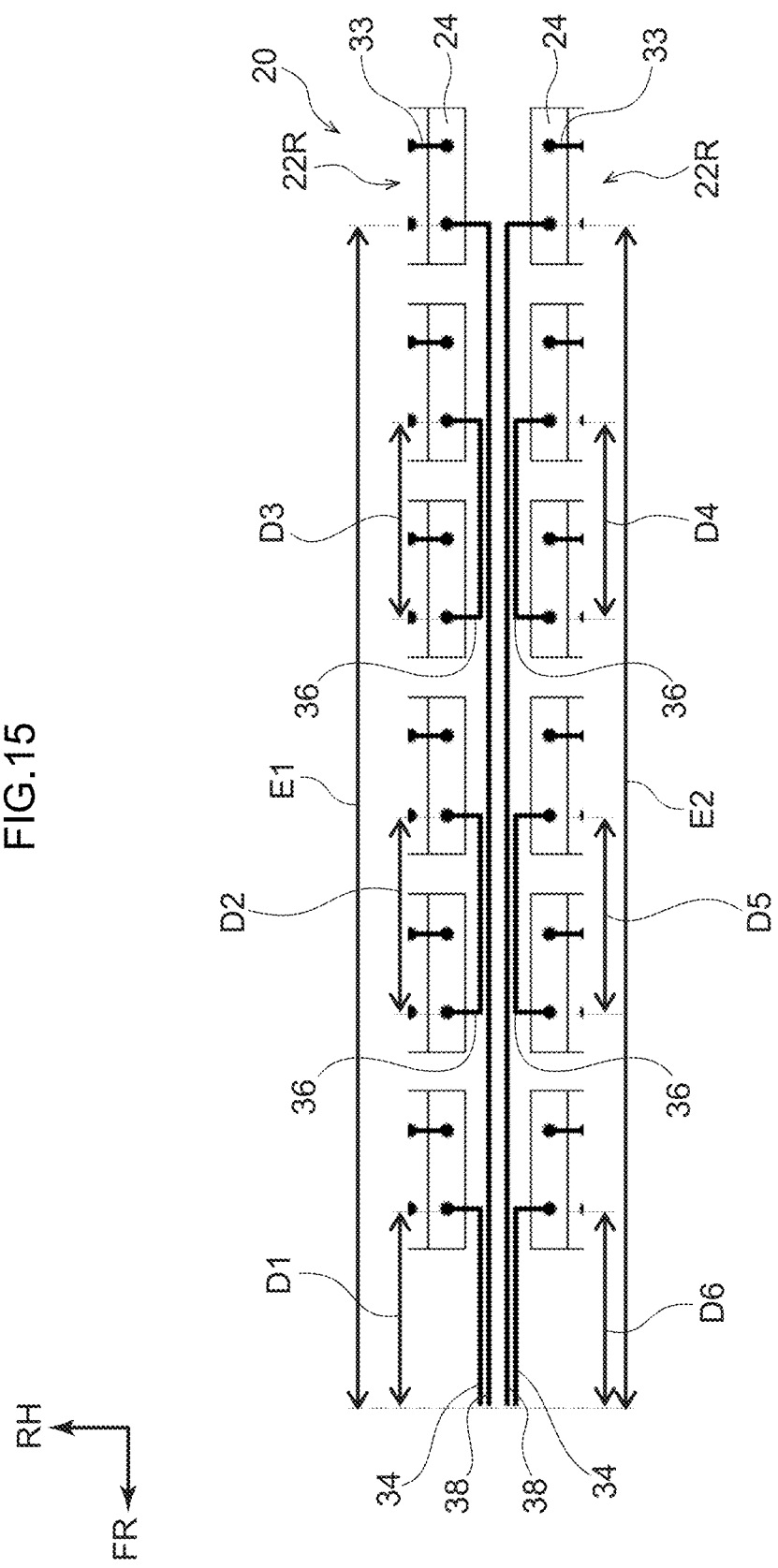

BATTERY COOLING STRUCTURE

CROSS-REFERENCE TO RELATED APPLICATION

This application is based on and claims priority under 35 USC 119 from Japanese Patent Application No. 2020-003223 filed on Jan. 10, 2020, the disclosure of which is incorporated by reference herein.

BACKGROUND

Technical Field

The present disclosure relates to a battery cooling structure for a vehicle.

Related Art

Batteries in which plural cells are connected in series have been known since heretofore (for example, see Japanese Patent Application Laid-Open (JP-A) No. 2017-162631). The plural cells are arranged with positive terminals and negative terminals alternately reversed in a row direction and in a column direction. Thus, intra-cell currents of adjacent cells flow in opposite directions to one another alternatingly in the row direction and the column direction. Therefore, magnetic fields generated by intra-cell currents are in mutually opposite directions and cancel out, and the production of electromagnetic noise from the battery is suppressed.

SUMMARY

A cooling means that is sufficient for and uniform between the cells is necessary for compatibility with rapid charging and the like. However, in the battery described above, a cooling plate that serves as a cooling means contacts only side walls extending in a short side direction of the cells (a direction orthogonal to a long side direction and to a thickness (shortest side) direction) and does not contact side walls extending in the long side direction. Thus, cooling performance of the cells in the battery described above is not necessarily sufficient.

An objective of the present disclosure is to provide a battery cooling structure for a vehicle that improves cooling performance of cells constituting a battery while suppressing the production of electromagnetic noise from the battery.

In order to achieve the object described above, a battery cooling structure for a vehicle according to a first aspect includes a battery including a plurality of cell groups arrayed in a vehicle body front-and-rear direction, wherein: each cell group includes a plurality of cuboid cells that are arrayed in a thickness direction of the cells, each cell includes a positive terminal provided at one side wall that extending in a short side direction of the cell and a negative terminal provided at another side wall extending in the short side direction. The positive terminals of one of the cell groups and the negative terminals of another of the cell groups, which cell groups are adjacent in the vehicle body front-and-rear direction, oppose one another in a plan view.

According to this battery cooling structure for a vehicle, side walls extending in the long side direction of the cells forming the cell groups are oriented to a vehicle body upper side and vehicle body lower side. That is, the side walls extending in the long side direction of the cells act as heat-radiating surfaces. In addition, the positive terminals of one cell group and the negative terminals of the another cell group that are adjacent in the vehicle body front-and-rear direction oppose one another in plan view. Therefore, magnetic fields produced between the cell groups cancel out one another. Thus, according to the first aspect, cooling performance of the cells constituting the battery may be improved while the production of electromagnetic noise from the battery is suppressed.

A second aspect is the battery cooling structure for a vehicle according to the first aspect, further including a cooling plate, wherein a side wall of each of the cells that extends in a long side direction of the cell, and that forms the cell groups, contacts a cooling plate.

According to this battery cooling structure for a vehicle, because the side walls extending in the long side direction of the cells forming the cell groups contact the cooling plate, cooling performance of the cells constituting the battery is improved more effectively.

A third aspect is the battery cooling structure for a vehicle according to the first aspect or the second aspect, further including a first bus bar that connects the positive terminals of the one of the cell groups and a second bus bar that connects the negative terminals of the another of the cell groups, the one of the cell groups and the another of the cell groups being adjacent in the vehicle body front-and-rear direction, wherein the first bus bar and the second bus bar are disposed in parallel in plan view, and a direction of a current flowing in the first bus bar and a direction of a current flowing in the second bus bar are mutually opposite directions.

According to this battery cooling structure for a vehicle, the direction of current flowing in the first bus bar and the direction of current flowing in the second bus bar are opposite to one another. Therefore, respective magnetic fields that are generated by the currents flowing in the first bus bar and the second bus bar cancel out one another. Thus, the production of electromagnetic noise from the battery is suppressed.

A fourth aspect is the battery cooling structure for a vehicle, further including: a battery including a plurality of cell groups arrayed in a vehicle body front-and-rear direction, each cell group including a plurality of cuboid cells that are arrayed in a thickness direction of the cells, each cell including a positive terminal provided at one side wall extending in a short side direction of the cell and a negative terminal provided at another side wall extending in the short side direction, and a side wall of each of the cells that extends in a long side direction of the cell, and that forms the cell groups, contacting a cooling plate; a first bus bar including a bus bar element that electrically connects electrical equipment provided in the vehicle with one of the positive terminals or negative terminals of the battery, and a bus bar element that electrically connects one of the cell groups with another of the cell groups, which cell groups are adjacent in the vehicle body front-and-rear direction; and a second bus bar that electrically connects the electrical equipment with the other of the positive terminals or negative terminals of the battery, wherein the first bus bar and the second bus bar are disposed in parallel in a side view, and a direction of a current flowing in the first bus bar and a direction of a current flowing in the second bus bar are mutually opposite directions.

According to this battery cooling structure for a vehicle, the direction of current flowing in the first bus bar and the direction of current flowing in the second bus bar are opposite to one another. Therefore, respective magnetic fields that are generated by the currents flowing in the first bus bar and the second bus bar cancel out one another. Thus, the production of electromagnetic noise from the battery is suppressed.

A fifth aspect is the battery cooling structure for a vehicle according to the third aspect or the fourth aspect, in which the first bus bar and the second bus bar are supported by a shared bracket.

According to this battery cooling structure for a vehicle, the first bus bar and the second bus bar are supported by the shared bracket. Therefore, a separation between bus bars that is optimum for suppressing the production of electromagnetic noise can be maintained.

As described above, according to the present disclosure, cooling performance of cells constituting a battery may be improved while the production of electromagnetic noise from the battery is suppressed.

BRIEF DESCRIPTION OF THE DRAWINGS

Exemplary embodiments of the present invention will be described in detail based on the following figures, wherein:

FIG. 3 is a graph showing a relationship between a magnetic field canceling effect and a distance between bus bars according to the first exemplary embodiment;

FIG. 14 is a perspective view schematically showing the variant example of the battery cooling structure according to the second exemplary embodiment; and FIG. 15 is a plan view showing a magnification of a portion of the variant example of the battery cooling structure according to the second exemplary embodiment.

DETAILED DESCRIPTION

Figure 1:
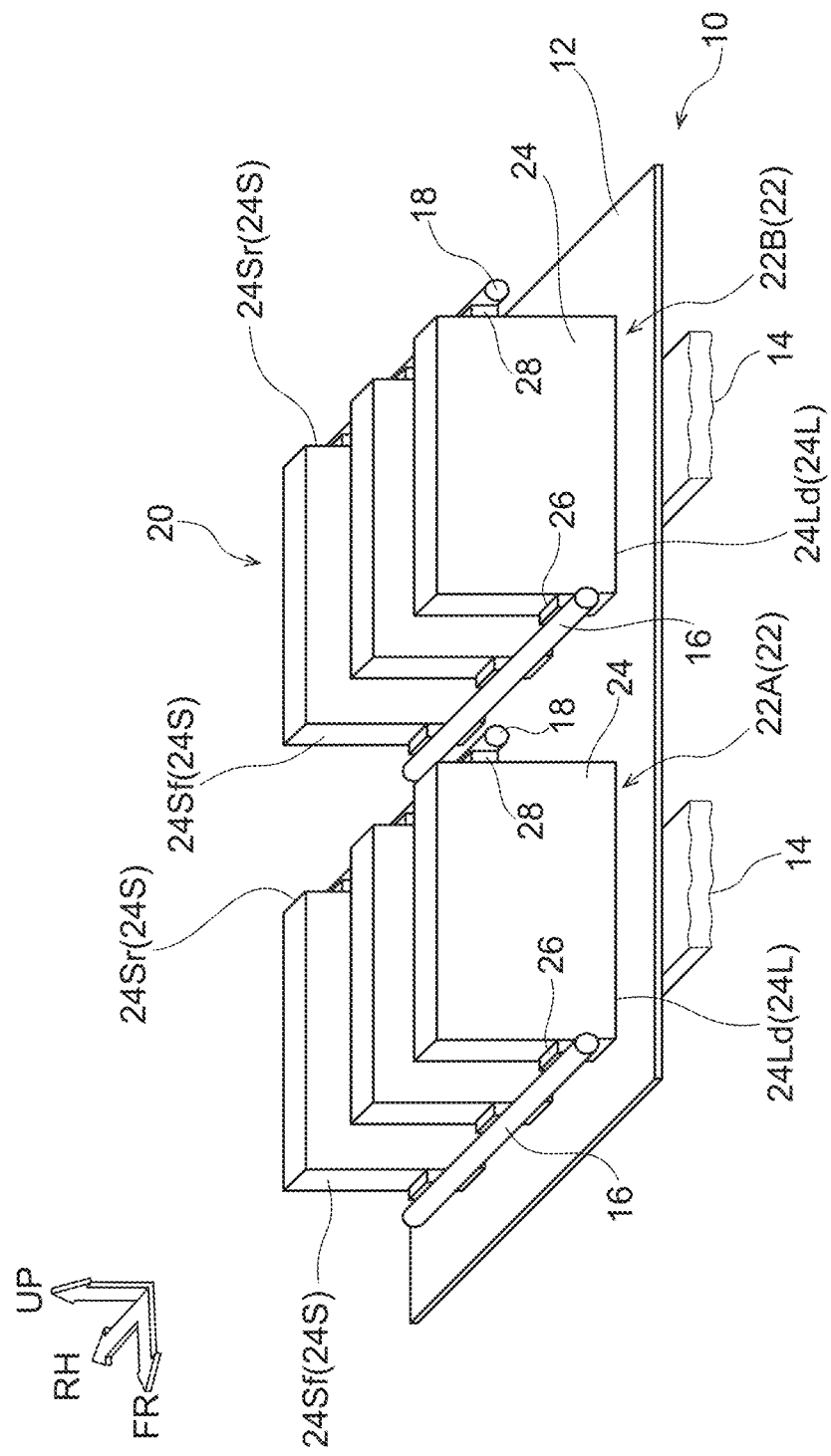
FIG. 1 is a perspective view schematically showing a battery cooling structure according to a first exemplary embodiment.

Herebelow, exemplary embodiments relating to the present disclosure are described in detail in accordance with the drawings. For convenience of description, the arrow UP that is shown where appropriate in the drawings indicates a vehicle body upper direction, the arrow FR indicates a vehicle body front direction, and the arrow RH indicates a vehicle body right direction. Accordingly, in the following descriptions, where the directions upper and lower, front and rear, and left and right are recited without being particularly specified, the same represent upper and lower in the vehicle body vertical direction, front and rear in the vehicle body front-and-rear direction, and left and right in the vehicle body left-and-right direction (vehicle width direction). A view seen in the vehicle width direction is referred to as a side view. Structural elements that are illustrated using the same reference symbols in the drawings are structural elements that are the same or similar. Duplicative descriptions and reference symbols may be omitted in the exemplary embodiments described below.

First Exemplary Embodiment

First, a battery cooling structure 10 according to a first exemplary embodiment is described.

Figure 2:
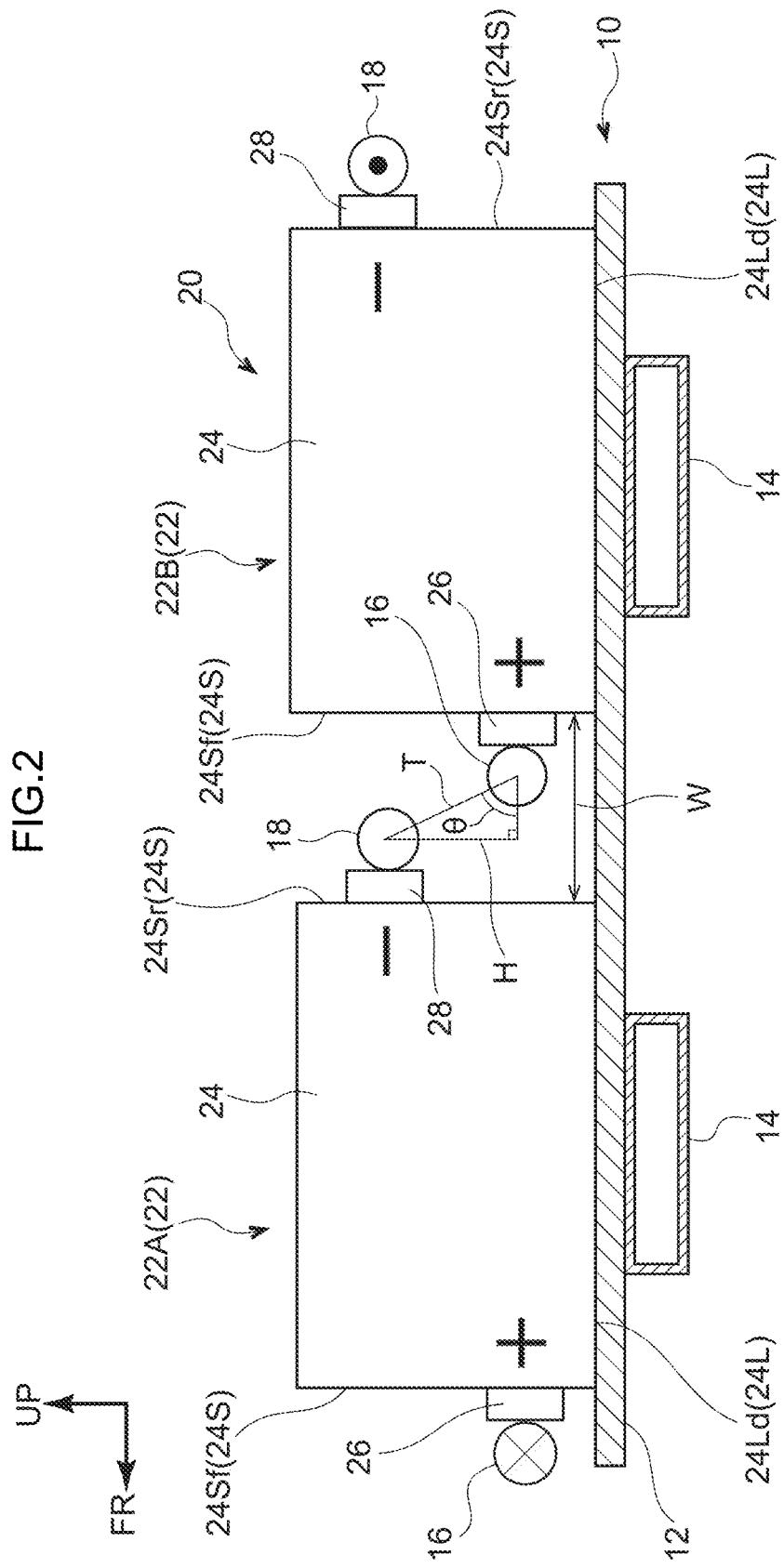
FIG. 2 is a side view schematically showing the battery cooling structure according to the first exemplary embodiment.

As shown in FIG. 1 and FIG. 2, a battery cooling structure 10 is provided with a battery 20 below the floor of an electric car that serves as a vehicle. The battery 20 includes cell groups 22, in each of which plural cells 24 are arrayed in a thickness direction thereof at an upper face of a cooling plate 12 that is formed in a substantially rectangular plate shape. Each cell 24 is formed in a cuboid shape with a side wall 24L that extends in a long side direction thereof oriented to the lower side. A plural number of the cell groups 22 are arrayed in the front-and-rear direction.

Figure 6:
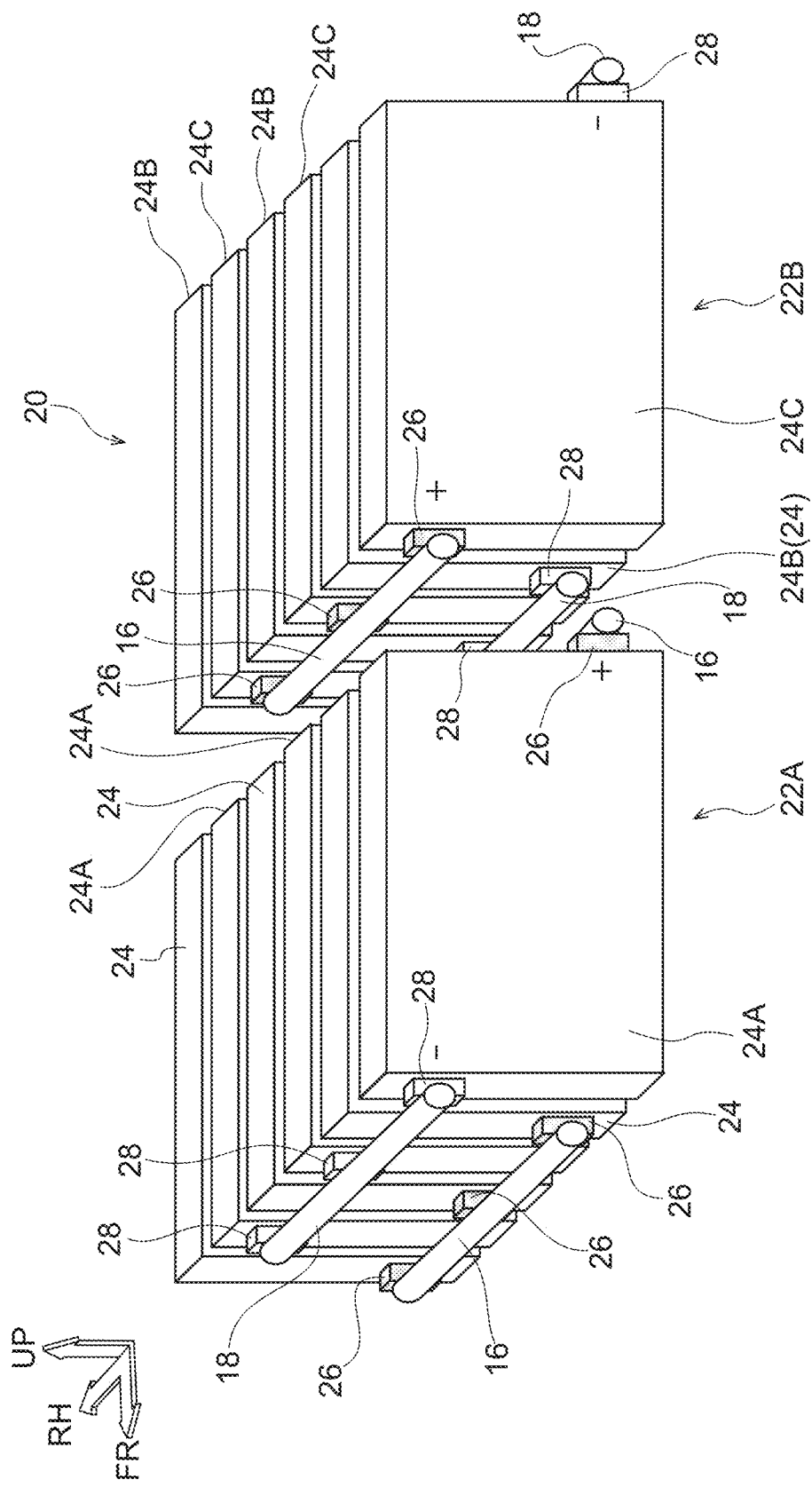
FIG. 6 is a perspective view schematically showing a variant example of the battery cooling structure according to the first exemplary embodiment.

In FIG. 1 and FIG. 6, gaps between the cells 24 arrayed in the thickness direction are depicted as being wider than in actuality. That is, the actual cells 24 are arrayed to form the cell groups 22 with substantially no gaps between the cells 24 in the thickness direction (see FIG. 8). Because the cell groups 22 have the same structures, in some descriptions below, one cell group 22A (that is, a front side cell group) and another cell group 22B (that is, a rear side cell group) that are adjacent in the front-and-rear direction are used as examples.

At each cell 24, a positive terminal 26 is provided at one side wall 24Sf, which extends in a short side direction, and a negative terminal 28 is provided at another side wall 24Sr, which also extends in the short side direction. The negative terminals 28 of the one cell group 22A and positive terminals 26 of the another cell group 22B that are adjacent in the front-and-rear direction oppose one another in plan view.

In specific terms, in a side view as shown in FIG. 2, the negative terminals 28 of the one cell group 22A and the positive terminals 26 of the another cell group 22B oppose one another in the front-and-rear direction with an offset in the vertical direction. Each positive terminal 26 is provided at the lower side of the side wall 24Sf, and each negative terminal 28 is provided at the upper side of the side wall 24Sr. That is, the positive terminals 26 and the negative terminals 28 are provided at vicinities of two ends of the cells 24, on a diagonal in side view.

As shown in FIG. 1 and FIG. 2, the positive terminals 26 of the one cell group 22A and the another cell group 22B are connected in parallel by positive bus bars (P lines) 16 that serve as a first bus bar, and the negative terminals 28 are connected in parallel by negative bus bars (N lines) 18 that serve as a second bus bar. That is, the positive bus bars 16 and negative bus bars 18 are disposed in parallel in plan view. Directions of currents in the positive bus bars 16 and negative bus bars 18 may be specified by how the positive bus bars 16 and negative bus bars 18 are connected between the front and rear cell groups 22A and 22B, within the one cell group 22A and within the another cell group 22B. A direction of current flowing in each positive bus bar 16 and a direction of current flowing in each negative bus bar 18 are mutually opposite directions.

Therefore, a magnetic field generated by current flowing in each positive bus bar 16 and a magnetic field generated by current flowing in each negative bus bar 18 cancel out one another. This canceling effect varies depending on a distance in the vertical direction between the positive bus bar 16 and the negative bus bar 18. Accordingly, the distance in the vertical direction between the positive bus bar 16 (the positive terminals 26) and the negative bus bar 18 (the negative terminals 28) is specified so as to obtain a desired canceling effect.

As shown in FIG. 3, if the bottom of the feet of a vehicle occupant is referred to as a measurement point J, a distance K from the measurement point J to the negative bus bars 18 provided at the upper side of the cells 24 is, for example, 80 mm in an ordinary electric car.

In this case, in order to obtain, for example, a canceling effect of at least 6 dB at the measurement point J, a distance H in the vertical direction between the positive bus bar 16 and the negative bus bar 18 may be set to 40 mm or less. A spacing W in the front-and-rear direction between the cell groups 22 (see FIG. 2) is specified such that the distance H in the vertical direction is, for example, 40 mm or less.

More specifically, as shown in FIG. 2, if a diagonal line joining the center of the positive bus bar 16 with the center of the negative bus bar 18 is represented by T, and an angle that this line T forms with the horizontal direction is represented by θ, the angle θ is specified such that T sin θ≤40 mm. That is, the spacing W between the side wall 24Sf of one of the cells 24 of the one cell group 22A and the side wall 24Sr of the cells 24 of the another cell group 22B is specified such that the angle θ satisfies this condition.

As mentioned above, a side wall 24Ld extending in the long side direction at the lower side of each cell 24 constituting the battery 20 (the cell groups 22) contacts the upper face of the cooling plate 12. An upper face of a cooling duct 14 in a substantially rectangular tube shape that extends in the vehicle width direction contacts a lower face of the cooling plate 12 directly below an area including a long side direction central portion of the side wall 24Ld. A cooling fluid flows in the cooling duct 14. Thus, the cooling plate 12 is continuously cooled by the cooling fluid flowing in the cooling ducts 14.

Now, operation of the battery cooling structure 10 according to the first exemplary embodiment structured as described above is described.

As shown in FIG. 1 and FIG. 2, the positive bus bars 16 and the negative bus bars 18 are disposed to be parallel, and the direction of currents flowing in the positive bus bars 16 and the direction of currents flowing in the negative bus bars 18 are mutually opposite directions. Therefore, magnetic fields generated by currents flowing in the positive bus bars 16 and magnetic fields generated by currents flowing in the negative bus bars 18 cancel out (that is, counter) one another. As a result, the production of electromagnetic noise from the battery 20 is suppressed.

Because the negative terminals 28 of the one cell group 22A and the positive terminals 26 of the another cell group 22B that are adjacent in the front-and-rear direction oppose one another, each cell 24 forming the cell groups 22 is oriented with the side walls 24L that extend in the long side direction oriented to the upper side and the lower side. Therefore, the side walls 24L extending in the long side direction of the cells 24 may serve as heat-radiating surfaces. As a result, cooling performance of the cells 24 may be improved compared to a structure in which side walls 24S that extend in the short side direction of the cells 24 serve as heat-radiating surfaces.

Moreover, the side wall 24Ld extending in the long side direction at the lower side of each cell 24 forming the cell groups 22 contacts the cooling plate 12, which is continuously cooled by the cooling fluid flowing through the cooling ducts 14. That is, the side walls 24Ld extending in the long side direction at the lower side of the cells 24 act as cooling surfaces. Therefore, the cells 24 may be cooled sufficiently and uniformly by the cooling plate 12, and cooling performance of the cells 24 may be more effectively improved. Consequently, the battery 20 may be compatible with situations requiring high cooling performance, such as rapid charging and the like.

According to this structure, cooling of the side walls 24S extending in the short side direction of the cells 24 is not necessary. Therefore, the side walls 24S extending in the short side direction of the cells 24 may be disposed as close to one another as possible. As a result, space required for mounting the battery 20 in the electric car may be reduced.

Variant Example of the First Exemplary Embodiment

Now, a variant example of the battery cooling structure 10 according to the first exemplary embodiment is described.

Figure 4:
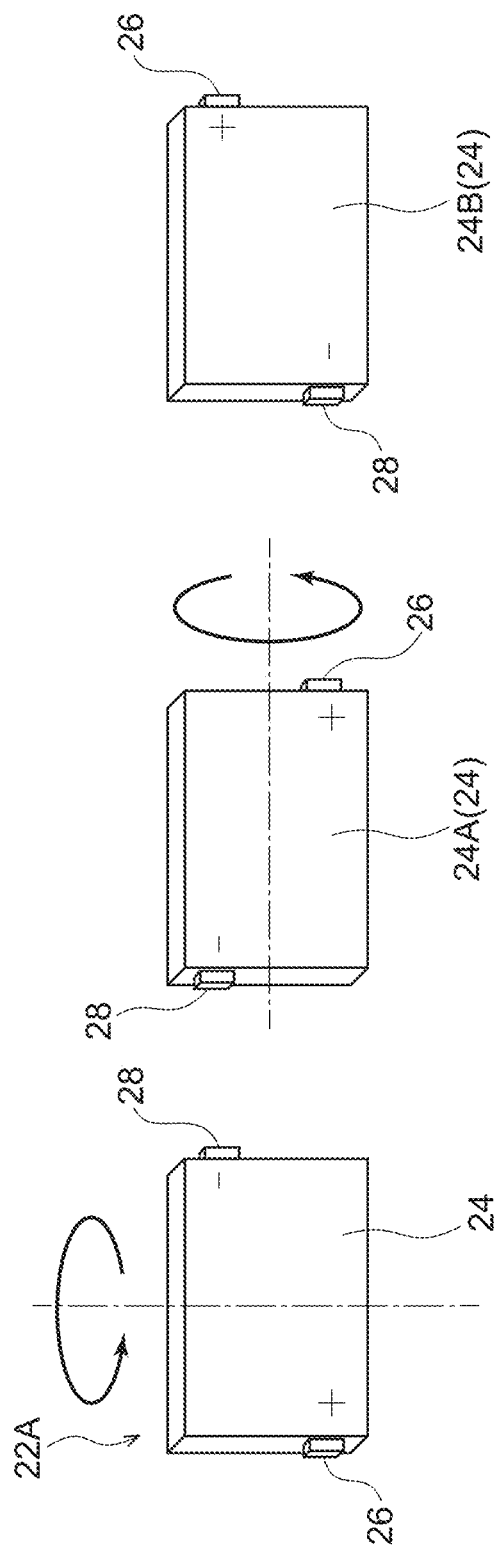
FIG. 4A is a descriptive diagram showing a step of changing an orientation of a cell according to the first exemplary embodiment.
FIG. 4B is a descriptive diagram showing the step of changing the orientation of the cell according to the first exemplary embodiment.
FIG. 4C is a descriptive diagram showing the step of changing the orientation of the cell according to the first exemplary embodiment.
Figure 5:
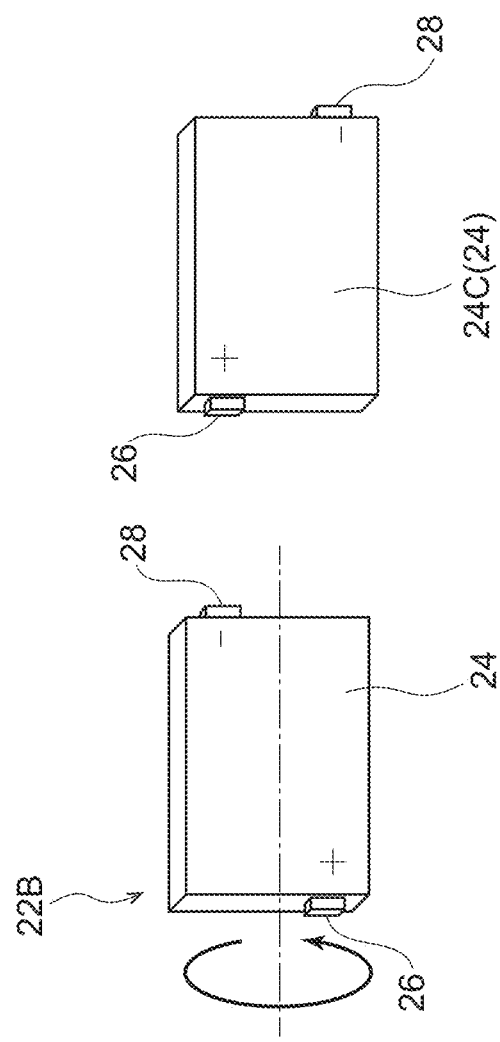
FIG. 5A is a descriptive diagram showing a step of changing an orientation of a cell according to the first exemplary embodiment.
FIG. 5B is a descriptive diagram showing the step of changing the orientation of the cell according to the first exemplary embodiment.

As shown in FIG. 4A to FIG. 4C, some of the cells 24 forming the one cell group 22A in FIG. 2 are rotated about an axis in the vertical direction (see FIG. 4A and FIG. 4B). Some of the cells 24 are rotated about an axis in the vertical direction and then rotated about an axis in the front-and-rear direction (see FIG. 4B and FIG. 4C). As shown in FIG. 5, some of the cells 24 forming the another cell group 22B in FIG. 2 are rotated about an axis in the front-and-rear direction (see FIG. 5A and FIG. 5B).

Each cell 24 shown in FIG. 4B is referred to as a cell 24A, each cell 24 shown in FIG. 4C is referred to as a cell 24B, and each cell 24 shown in FIG. 5B is referred to as a cell 24C, distinguishing these cells from the cells 24 shown in FIG. 2. As shown in FIG. 6, in the one cell group 22A, the cell 24A, the cell 24, the cell 24A, the cell 24, etc. are arranged alternating in the thickness direction in this order from a vehicle width direction left side end portion of the one cell group 22A. In the another cell group 22B, the cell 24C, the cell 24B, the cell 24C, the cell 24B, etc. are arranged alternating in the thickness direction in this order from a vehicle width direction left side end portion of the another cell group 22B.

Figure 7:
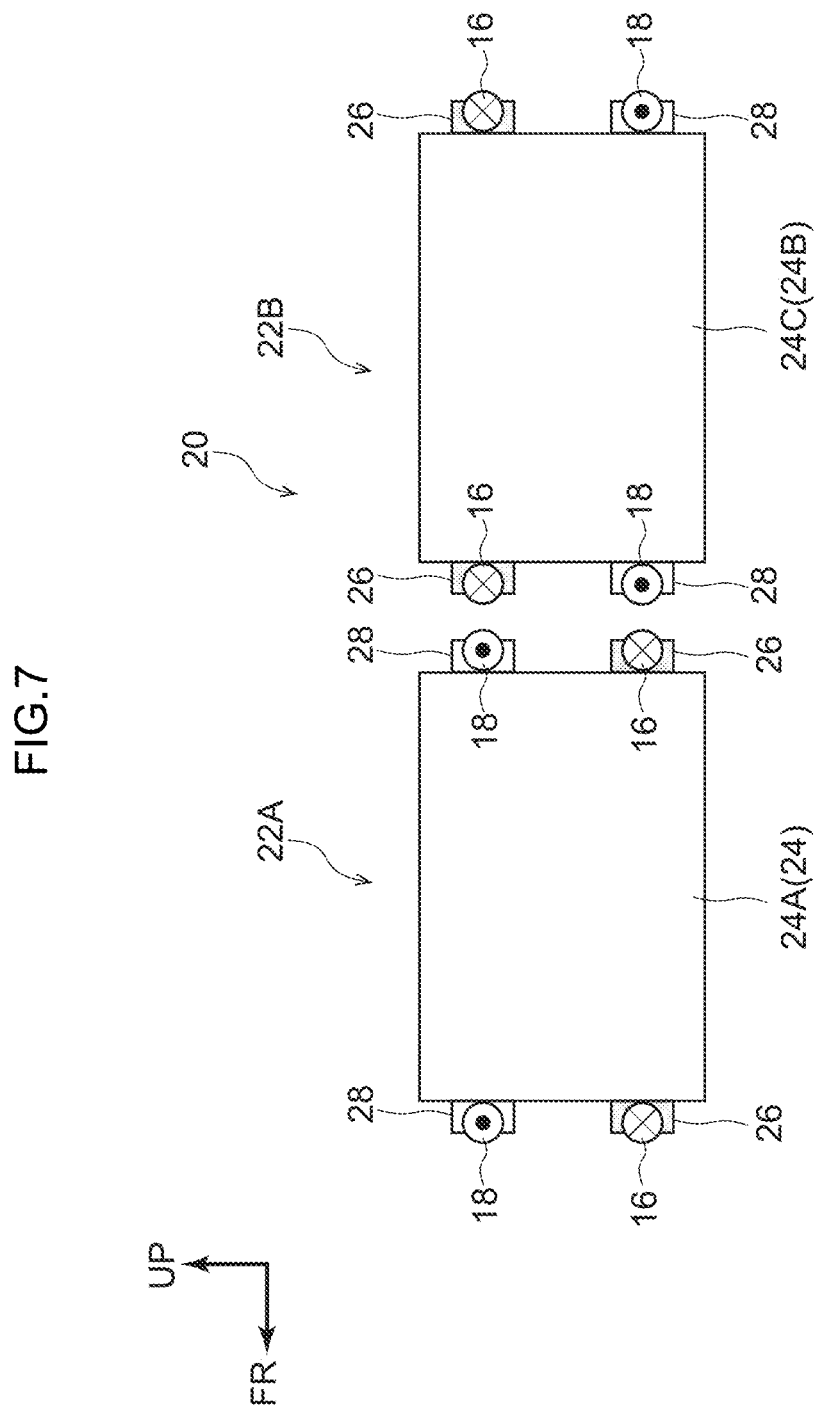
FIG. 7 is a side view schematically showing the variant example of the battery cooling structure according to the first exemplary embodiment.

As shown in FIG. 6 and FIG. 7, in the one cell group 22A, the positive terminals 26 disposed at the alternate cells 24 are connected with the positive bus bars 16 in parallel, and the negative terminals 28 disposed at the alternate cells 24 are connected with the negative bus bars 18 in parallel. Similarly, in the another cell group 22B, the positive terminals 26 disposed at the alternate cells 24 are connected with the positive bus bars 16 in parallel, and the negative terminals 28 disposed at the alternate cells 24 are connected with the negative bus bars 18 in parallel.

Thus, at the one cell group 22A including the cells 24A and the cells 24 and the another cell group 22B including the cells 24C and the cells 24B, the directions of currents flowing in the corresponding positive bus bars 16 and negative bus bars 18 that oppose one another in the front-and-rear direction are mutually opposite directions.

Further, at the one cell group 22A, the directions of currents flowing in the positive bus bars 16 and negative bus bars 18 that oppose one another in the vertical direction are mutually opposite directions, and at the another cell group 22B, the directions of currents flowing in the positive bus bars 16 and negative bus bars 18 that oppose one another in the vertical direction are mutually opposite directions.

Therefore, magnetic fields generated by currents flowing in the long side direction of the cells 24 (specifically, in diagonal directions) and magnetic fields generated by currents flowing in the thickness direction of the cells 24 may simultaneously counter (cancel out) one another. In this variant example of the first exemplary embodiment, it is preferable if shapes, colors or the like of the positive terminals 26 and the negative terminals 28 are made different such that wiring errors may be prevented.

Second Exemplary Embodiment

Now, the battery cooling structure 10 according to a second exemplary embodiment is described. Portions that are the same as in the first exemplary embodiment are assigned the same reference symbols and, as appropriate, are not described in detail.

Figure 8:
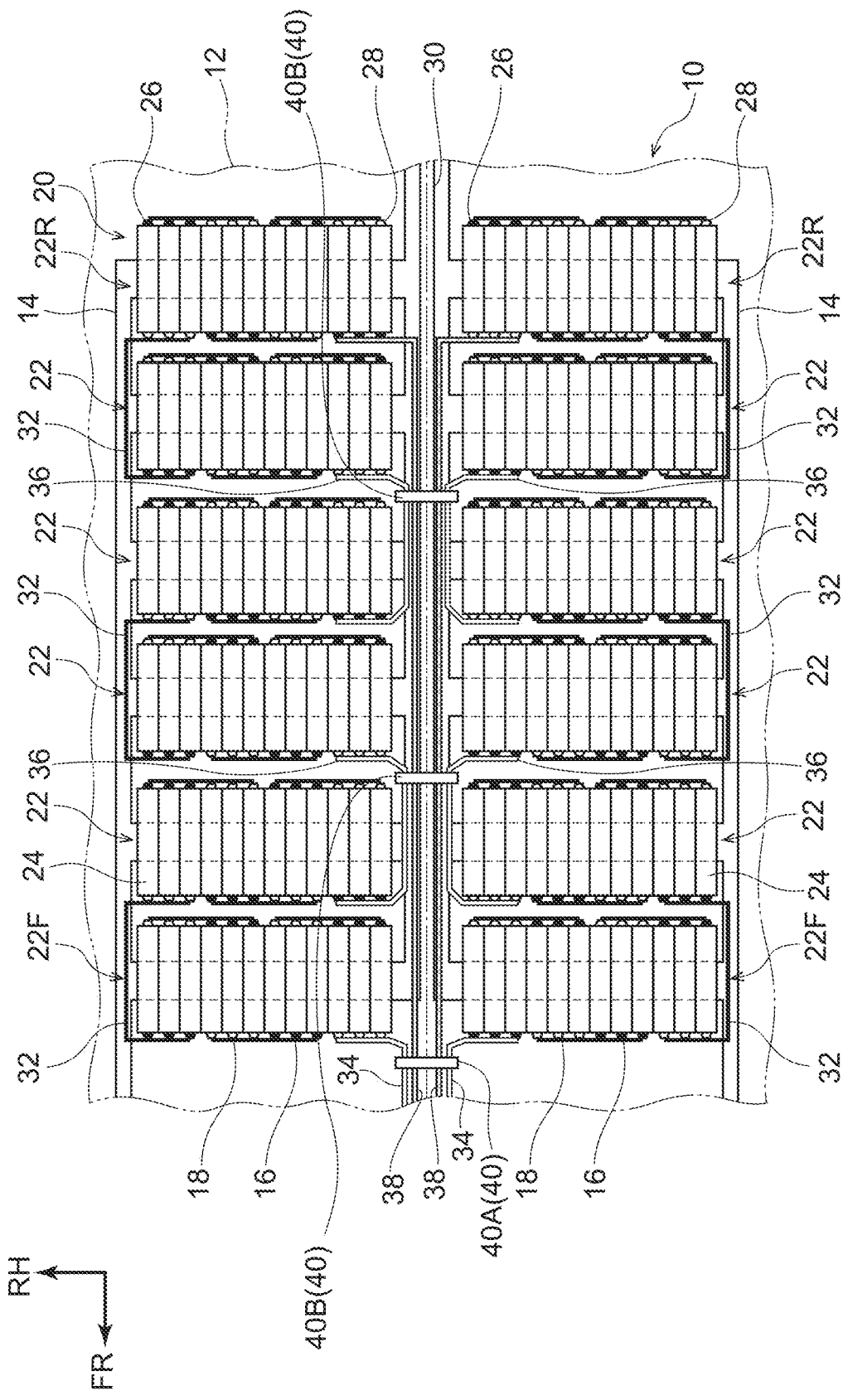
FIG. 8 is a plan view showing a battery cooling structure according to a second exemplary embodiment.

As shown in FIG. 8, in the second exemplary embodiment, the cell groups 22 are disposed at the upper face of the cooling plate 12, at the left and right sandwiching a vehicle width direction central portion of the cooling plate 12. The cell groups 22 are arranged in, for example, six rows counted in the front-and-rear direction. The six cell groups 22 at the left side are electrically connected separately from the six cell groups 22 at the right side.

Positive terminals (specifically, the positive terminals 26) and negative terminals (specifically, the negative terminals 28) of all of the left and right cell groups 22 are electrically connected to an inverter (not shown in the drawings), which serves as an example of electrical equipment, provided at the front side relative to the battery 20. The inverter is electrically connected to an electric motor (not shown in the drawings) for driving running. The cooling plate 12 is not shown in the drawing of FIG. 9; only the cooling ducts 14 are shown in FIG. 9.

Figure 10:
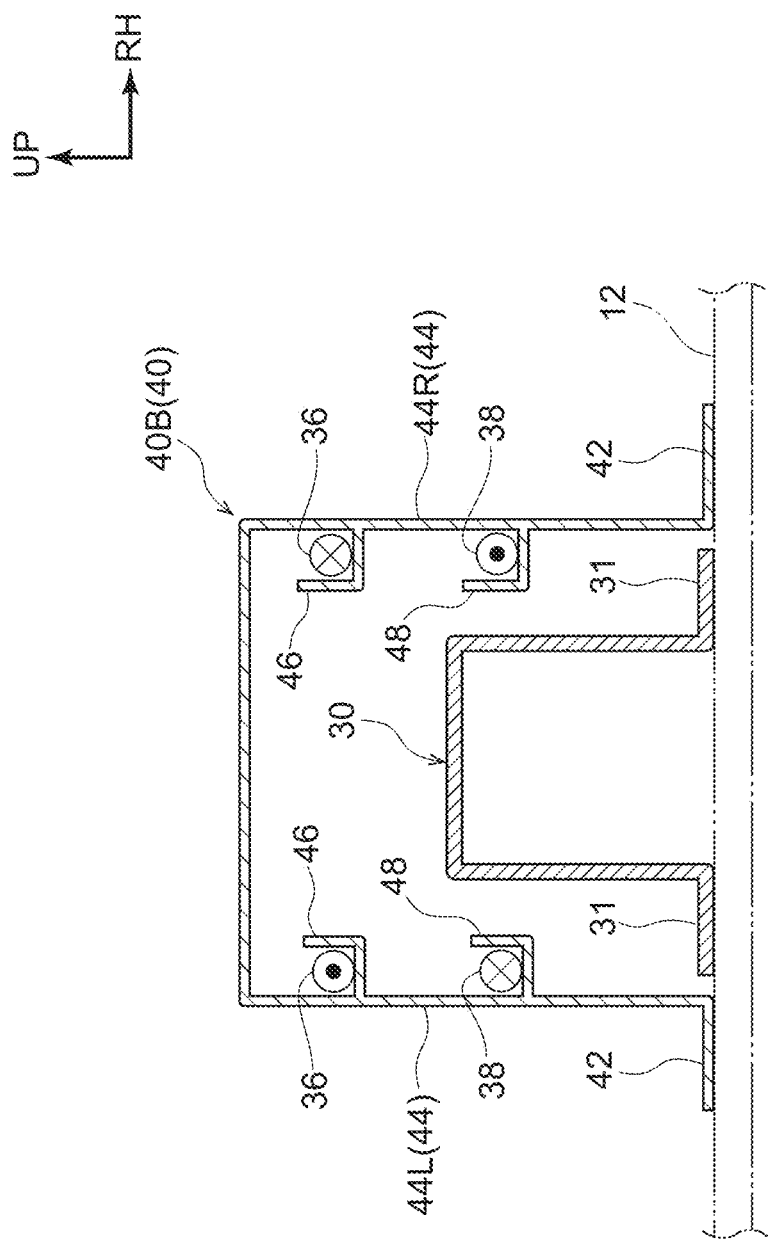
FIG. 10 is a front view showing a bracket of the battery cooling structure according to the second exemplary embodiment.

As shown in FIG. 8 and FIG. 10, a reinforcement 30, which extends in the front-and-rear direction, is formed in a hat shape in cross section. Left and right flange portions 31 of the reinforcement 30 are joined by joining means such as welding or the like to the vehicle width direction central portion of the upper face of the cooling plate 12. That is, the left and right cell groups 22 are disposed at both the left and right sides of the reinforcement 30.

Figure 9:
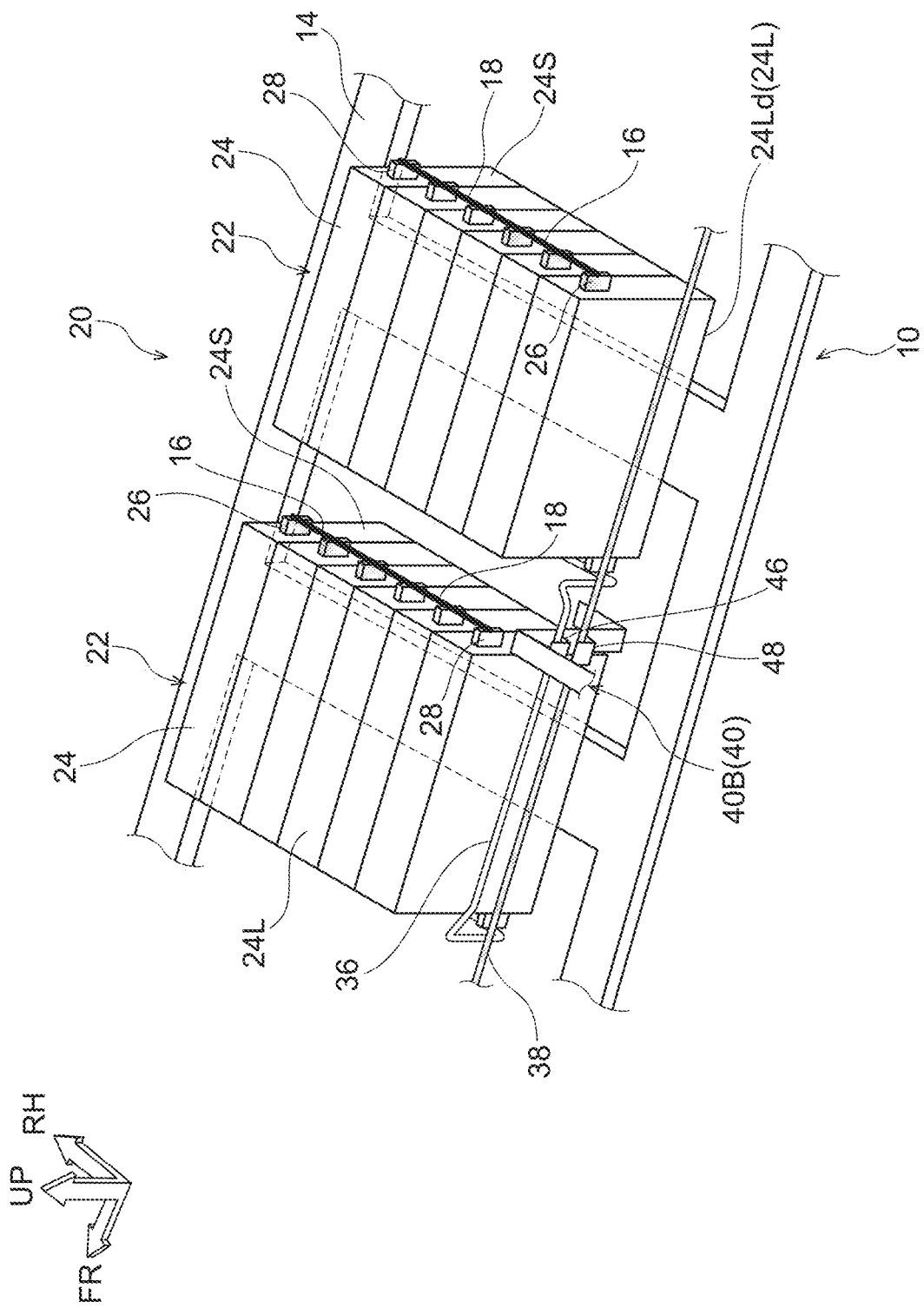
FIG. 9 is a perspective view schematically showing the battery cooling structure according to the second exemplary embodiment.

As shown in FIG. 8 and FIG. 9, the cells 24 are aggregated in groups of, for example, three with the same orientations. The cells 24 are arrayed in the thickness direction such that orientations of the positive terminals 26 and the negative terminals 28 alternate in opposite directions between the groups of three. The positive terminals 26 of each group of three cells 24 are connected in parallel by one of the positive bus bars 16, and the negative terminals 28 of each group of three cells 24 are connected in parallel by one of the negative bus bars 18.

The positive bus bar 16 of three of the cells 24 arrayed in the thickness direction and the negative bus bar 18 of the next three cells 24 arrayed in the thickness direction are integrally connected in series. Accordingly in the second exemplary embodiment, height positions of the positive terminals 26 provided at the side walls 24S extending in the short side direction of the cells 24 are the same as height positions of the negative terminals 28 provided at the side walls 24S (see FIG. 9).

The positive bus bars 16 and negative bus bars 18 connect the cell groups 22 that are adjacent to front and rear in series. Of these positive bus bars 16 and negative bus bars 18, each positive bus bar 16 or negative bus bar 18 that is disposed at a vehicle width direction outer side is referred to below as an outer side bus bar 32, and each positive bus bar 16 or negative bus bar 18 that is disposed at a vehicle width direction inner side is referred to as an inner side bus bar 36, which serves as a bus bar element of the first bus bar. In this structure, a total of six of the outer side bus bars 32 are provided, three each at left and right, and a total of four of the inner side bus bars 36 are provided, two each at left and right.

Furthermore, a bus bar that extends toward the front side through the vehicle width direction central portion from each frontmost cell group 22F and is electrically connected to electrical equipment such as, for example, an inverter (not shown in the drawings) is referred to below as an inner side bus bar 34, which also serves as a bus bar element of the first bus bar. That is, the first bus bar is the inner side bus bars 34 and the inner side bus bars 36, but this is not limiting. Either the inner side bus bars 34 or the inner side bus bars 36 may serve as the first bus bar. Meanwhile, a bus bar that extends toward the front side through the vehicle width direction central portion from each rearmost cell group 22R is referred to as a collection bus bar 38, which serves as the second bus bar.

A bracket 40A, which supports the inner side bus bars 34 and the collection bus bars 38, and brackets 40B, which support the inner side bus bars 36 and the collection bus bars 38, are provided at the vehicle width direction central portion of the cooling plate 12. The bracket 40A and the brackets 40B have similar structures, and therefore may be described below as brackets 40.

As shown in FIG. 8 and FIG. 9, the bracket 40A is provided at the front side relative to the frontmost cell groups 22F. Each bracket 40B is provided at a position that corresponds with a region in which a relatively large space is formed between the mutually opposing side walls 24S of the cell groups 22 that are adjacent in the front-and-rear direction, which side walls 24S extend in the short side direction.

As shown in FIG. 10, each bracket 40 is formed in a substantial hat shape in cross section and covers the reinforcement 30 from the upper side thereof. Flange portions 42 at the left and right of the bracket 40 are joined by joining means, such as welding or the like, to the upper face of the cooling plate 12. Support portions 46 and 48 are provided at inner faces of side walls 44 at the left and right of the bracket 40 (a side wall 44L at the left side and a side wall 44R at the right side). The support portions 46 and 48 protrude in, for example, substantial "L" shapes in cross section. Vertical gaps are formed between the support portions 46 and 48.

That is, the support portions 46 are provided protruding toward the vehicle width direction inner sides from the upper sides of the inner faces of the side walls 44, and the support portions 48 are provided protruding toward the vehicle width direction inner sides from the lower sides of the inner faces of the side walls 44. As shown in FIG. 9 and FIG. 10, the support portions 46 at the upper side of the bracket 40B support the inner side bus bars 36 from lower sides thereof, and the support portions 48 at the lower side support the collection bus bars 38 from lower sides thereof.

The directions of currents flowing in the inner side bus bars 36 supported by the support portions 46 at the upper side of the bracket 40B are opposite directions between the side walls 44 at the left and right sides (specifically, at the side wall 44L side and at the side wall 44R side). The directions of currents flowing in the collection bus bars 38 supported by the support portions 48 at the lower side of the bracket 40B are also opposite directions between the side walls 44 at the left and right sides (specifically, at the side wall 44L side and at the side wall 44R side). Moreover, at each of the side walls 44 at the left and right sides (specifically, at the side wall 44L side and at the side wall 44R side), the directions of currents flowing in the inner side bus bar 36 and the collection bus bar 38 are opposite directions.

Thus, a direction of a current flowing in the inner side bus bar 36 supported by the support portion 46 at the side wall 44R at the right side and a direction of a current flowing in the collection bus bar 38 supported by the support portion 48 at the side wall 44L at the left side are the same direction. Further, the direction of a current flowing in the collection bus bar 38 supported by the support portion 48 at the side wall 44R at the right side and the direction of a current flowing in the inner side bus bar 36 supported by the support portion 46 at the side wall 44L at the left side are the same direction.

At the bracket 40A, although not shown in the drawings, the support portions 46 at the upper side of the bracket 40A support the inner side bus bars 34 from the lower sides thereof, and the support portions 48 at the lower side of the bracket 40A support the collection bus bars 38 from the lower sides thereof. The above descriptions of the directions of currents similarly apply at the bracket 40A to currents flowing in the inner side bus bars 34 supported by the left and right support portions 46 and currents flowing in the collection bus bars 38 supported by the left and right support portions 48.

Therefore, magnetic fields generated by the currents flowing in the inner side bus bars 34 or inner side bus bars 36 and magnetic fields generated by the currents flowing in the collection bus bars 38 cancel out one another. Moreover, magnetic fields generated by the currents flowing in the inner side bus bars 34 cancel out one another, magnetic fields generated by the currents flowing in the inner side bus bars 36 cancel out one another, and magnetic fields generated by the currents flowing in the collection bus bars 38 cancel out one another.

This canceling effect varies depending on distances in the vertical direction and the left-and-right direction between the inner side bus bars 34 or inner side bus bars 36 and the collection bus bars 38. Accordingly, positions of the brackets 40 at which the support portions 46 and support portions 48 are provided are specified such that the desired canceling effect is obtained.

Figure 11:
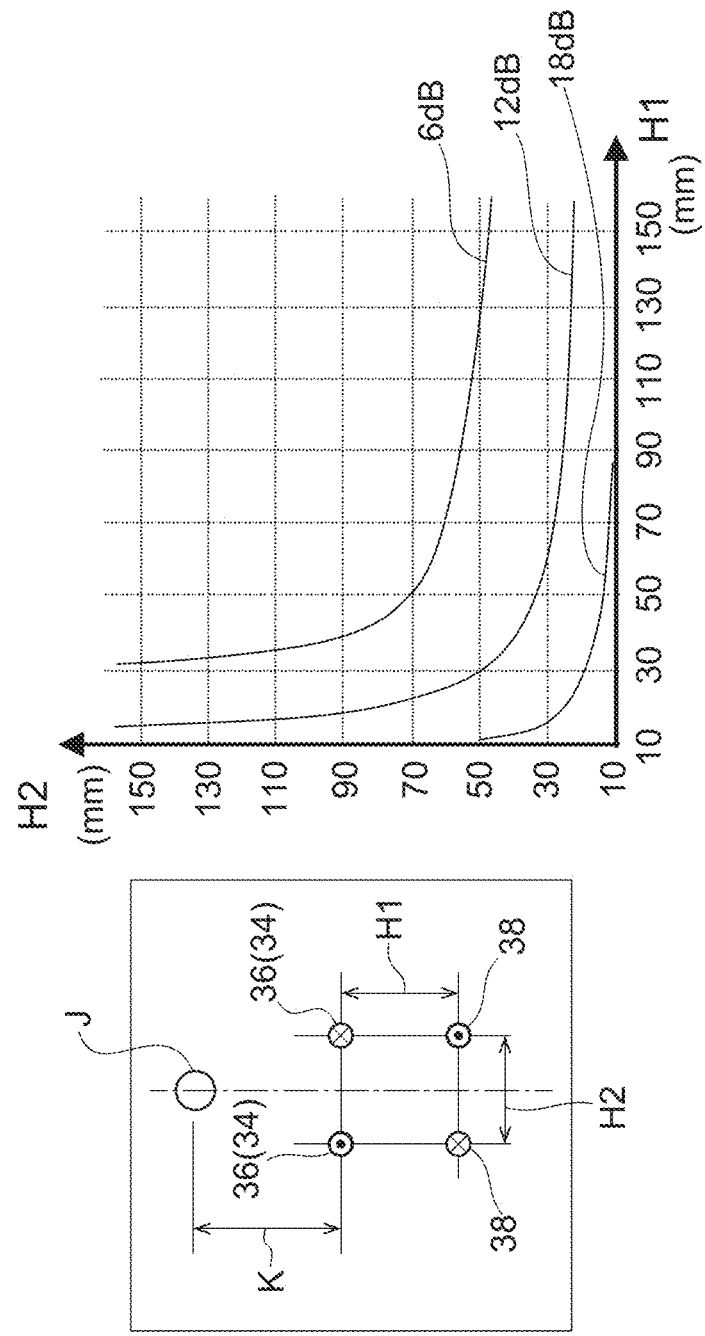
FIG. 11 is a graph showing a relationship between the magnetic field canceling effect and a distance between bus bars according to the second exemplary embodiment.

That is, as shown in FIG. 11, if the bottom of the feet of a vehicle occupant is the measurement point J, then a distance K from the measurement point J to the inner side bus bars 34 or inner side bus bars 36 is, for example, 80 mm in an ordinary electric car.

In this case, when a canceling effect of, for example, 6 dB is desired, the support portions 46 and support portions 48 are provided such that a distance H1 between the inner side bus bars 34 or inner side bus bars 36 and the collection bus bars 38 is, for example, 50 mm and a distance H2 between the inner side bus bars 34, between the inner side bus bars 36 and between the collection bus bars 38 is, for example, 70 mm.

Further, when a canceling effect of, for example, 12 dB is desired, the support portions 46 and support portions 48 are provided such that the distance H1 between the inner side bus bars 34 or inner side bus bars 36 and the collection bus bars 38 is, for example, 30 mm and the distance H2 between the inner side bus bars 34, between the inner side bus bars 36 and between the collection bus bars 38 is, for example, 50 mm.

Further still, when a canceling effect of, for example, 18 dB is desired, the support portions 46 and support portions 48 are provided such that the distance H1 between the inner side bus bars 34 or inner side bus bars 36 and the collection bus bars 38 is, for example, 15 mm and the distance H2 between the inner side bus bars 34, between the inner side bus bars 36 and between the collection bus bars 38 is, for example, 30 mm.

Figure 12:
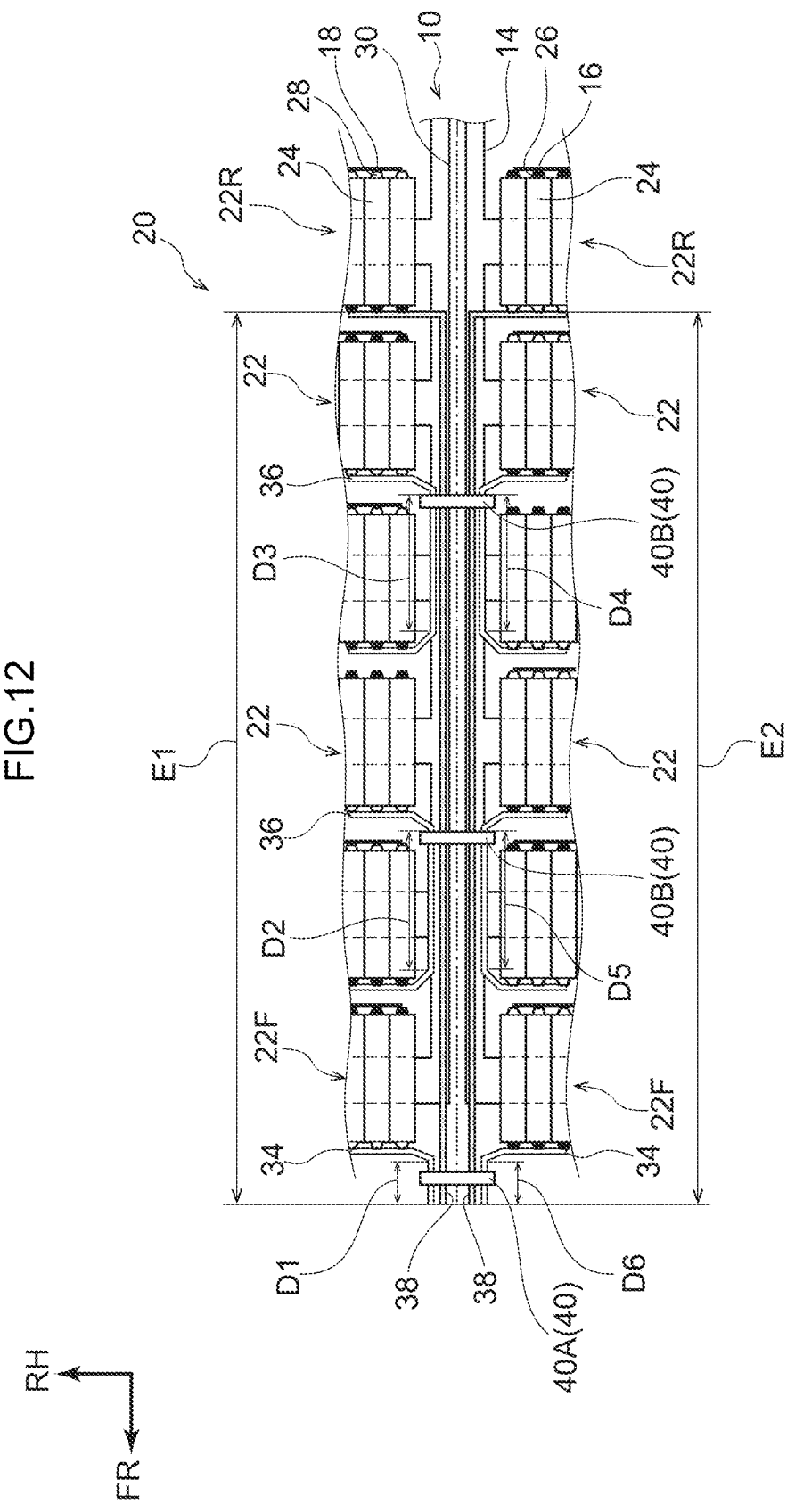
FIG. 12 is a plan view showing a magnification of a portion of the battery cooling structure according to the second exemplary embodiment.

If, as shown in plan view in FIG. 12, lengths of the inner side bus bars 34 that overlap with the collection bus bars 38 and lengths of the inner side bus bars 36 that overlap with the collection bus bars 38 are respectively represented by $D_i$ ($i=1, 2, 3, 4, 5$ or $6$) and lengths of the left and right collection bus bars 38 are represented by, respectively, $E_1$ and $E_2$, then it is preferable if the lengths of the inner side bus bars 34 that overlap with the collection bus bars 38 and the lengths of the inner side bus bars 36 that overlap with the collection bus bars 38 satisfy the relationship $\Sigma D_i > (E_1 + E_2)/2$. In this relationship, $\Sigma D_i = D_1 + D_2 + D_3 + D_4 + D_5 + D_6$.

Now, operation of the battery cooling structure 10 according to the second exemplary embodiment structured as described above is described. Descriptions of operations that that are the same as operations according to the first exemplary embodiment are omitted as appropriate.

As shown in FIG. 8 and FIG. 10, the reinforcement 30 is provided at the vehicle width direction central portion of the cooling plate 12, extends in the front-and-rear direction with the hat shape in cross section, and forms a chamber cross section. Thus, bending stiffness of the cooling plate 12 on which the plural cell groups 22 (six rows counted front to rear) are disposed at the left and right, sandwiching the reinforcement 30, may be improved.

The side walls 24L that extend in the long side direction of the cells 24 constituting the battery 20 (the cell groups 22) are oriented to the upper side and the lower side. Therefore, the side walls 24L extending in the long side direction of the cells 24 may serve as heat-radiating surfaces. As a result, cooling performance of the cells 24 may be improved compared to a structure in which the side walls 24S that extend in the short side direction of the cells 24 serve as heat-radiating surfaces.

The side walls 24Ld (see FIG. 9) extend in the long side direction at the lower sides of the cells 24 forming the cell groups 22, six of which counted front to rear are disposed at each of left and right to sandwich the reinforcement 30 as shown in FIG. 8. The side walls 24Ld contact the cooling plate 12 that is continuously cooled by the cooling fluid flowing through the cooling ducts 14.

That is, the side walls 24Ld that extend in the long side direction at the lower sides of the cells 24 act as cooling surfaces. Therefore, the cells 24 forming the cell groups 22 may be cooled sufficiently and uniformly by the cooling plate 12, and cooling performance of the cells 24 may be more effectively improved. Consequently, the battery 20 may be compatible with situations requiring high cooling performance, such as rapid charging and the like.

As shown in FIG. 10, at the left side side wall 44L and at the right side side wall 44R of each bracket 40B, the direction of a current flowing in the inner side bus bar 36 and the direction of a current flowing in the collection bus bar 38 are opposite directions. The directions of currents flowing in the inner side bus bars 36 supported by the support portions 46 are opposite directions, and the directions of currents flowing in the collection bus bars 38 supported by the support portions 48 are opposite directions.

Therefore, magnetic fields generated from the inner side bus bars 36 and magnetic fields generated from the collection bus bars 38 cancel out (counter) one another, and the production of electromagnetic noise from the vehicle width direction central portion (the battery 20) is suppressed. Moreover, because the inner side bus bars 36 and the collection bus bars 38 are supported by the shared brackets 40B that are formed in the hat shape in cross section, distances between the bus bars that are optimum for suppressing the production of electromagnetic noise may be maintained.

The above descriptions similarly apply to the bracket 40A. Furthermore, lengths of the inner side bus bars 34 that overlap with the collection bus bars 38 and lengths of the inner side bus bars 36 that overlap with the collection bus bars 38 are set to lengths that satisfy the relationship $\Sigma Di > (E1+E2)/2$. Therefore, a stronger canceling effect (countering effect) is obtained than if $\Sigma Di \leq (E1+E2)/2$.

Variant Example of the Second Exemplary Embodiment

Lastly, a variant example of the battery cooling structure 10 according to the second exemplary embodiment is described. Operation of the variant example is similar to the second exemplary embodiment, and therefore is not described here.

Figure 13:
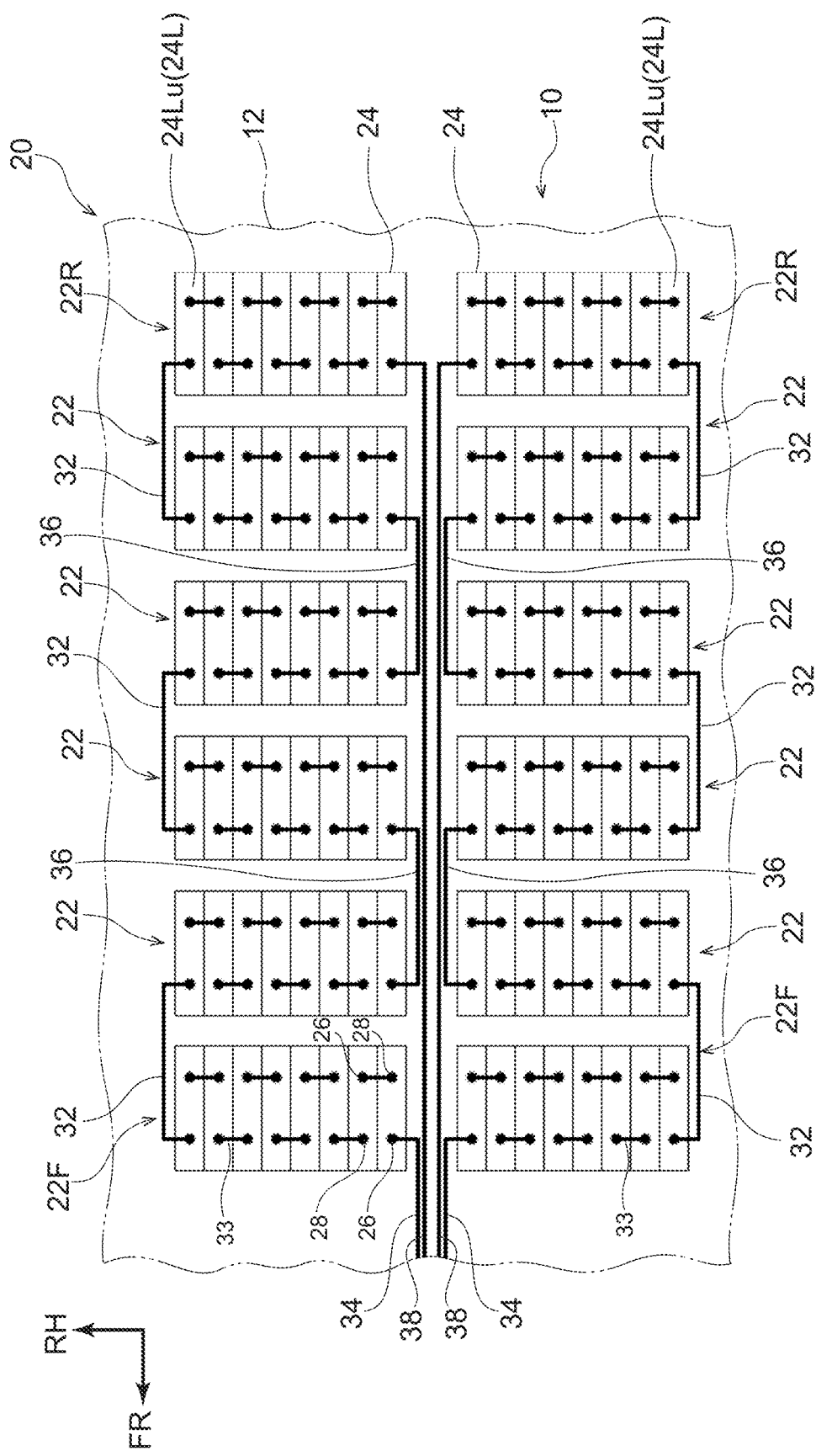
FIG. 13 is a plan view showing a variant example of the battery cooling structure according to the second exemplary embodiment.

As shown in FIG. 13 and FIG. 14, this variant example differs from the second exemplary embodiment only in that the positive terminals 26 and negative terminals 28, which are separated in the long side direction, are provided at side walls 24Lu that extend in the long side direction at the upper sides of the cells 24. In this structure, the positive terminals 26 and negative terminals 28 that are adjacent in the thickness direction are successively connected in series by bus bars 33. The reinforcement 30, the cooling ducts 14 and the like are not shown in the drawings of FIG. 13 to FIG. 15.

Of bus bars 33 that extend between the cell groups 22 that are adjacent to front and rear and connect these cell groups 22 in series, bus bars that are disposed at the vehicle width direction outer sides are the outer side bus bars 32, and bus bars that are disposed at the vehicle width direction inner sides are the inner side bus bars 36, which serve as the first bus bar. In this structure too, six of the outer side bus bars 32 are provided, three each at left and right, and four of the inner side bus bars 36 are provided, two each at left and right.

Bus bars that extend to the front side through the vehicle width direction central portion from the frontmost cell groups 22F are the inner side bus bars 34, which serve as the first bus bar. Bus bars that extend to the front side through the vehicle width direction central portion from the rearmost cell groups 22R are the collection bus bars 38, which serve as the second bus bar.

Although not shown in the drawing of FIG. 13, the bracket 40A that supports the inner side bus bars 34 and the collection bus bars 38 and the brackets 40B that support the inner side bus bars 36 and the collection bus bars 38 are provided at the vehicle width direction central portion of the cooling plate 12. As shown in FIG. 14, the support portions 46 at the upper side of each bracket 40B support the inner side bus bars 36 from the lower sides thereof, and the support portions 48 at the lower side support the collection bus bars 38 from the lower sides thereof.

The directions of currents flowing in the inner side bus bars 36 supported by the support portions 46 at the upper side of the bracket 40B are opposite directions between the side walls 44 at the left and right sides. The directions of currents flowing in the collection bus bars 38 supported by the support portions 48 at the lower side of the bracket 40B are also opposite directions between the side walls 44 at the left and right sides. Moreover, at each of the side walls 44 at the left and right sides, the directions of currents flowing in the inner side bus bar 36 and the collection bus bar 38 are opposite directions.

The support portions 46 at the upper side of the bracket 40A support the inner side bus bars 34 from the lower sides thereof, and the support portions 48 at the lower side support the collection bus bars 38 from the lower sides thereof. The above descriptions of the directions of currents similarly apply at the bracket 40A to currents flowing in the inner side bus bars 34 supported by the left and right support portions 46 and currents flowing in the collection bus bars 38 supported by the left and right support portions 48.

Therefore, magnetic fields generated by the currents flowing in the inner side bus bars 34 or inner side bus bars 36 and magnetic fields generated by the currents flowing in the collection bus bars 38 cancel out one another. Moreover, magnetic fields generated by the currents flowing in the inner side bus bars 34 cancel out one another, magnetic fields generated by the currents flowing in the inner side bus bars 36 cancel out one another, and magnetic fields generated by the currents flowing in the collection bus bars 38 cancel out one another.

As shown in plan view in FIG. 15, lengths of the inner side bus bars 34 that overlap with the collection bus bars 38 and lengths of the inner side bus bars 36 that overlap with the collection bus bars 38 are respectively represented by Di (i=1, 2, 3, 4, 5 or 6) and lengths of the left and right collection bus bars 38 are represented by, respectively, E1 and E2. It is preferable if the lengths of the inner side bus bars 34 that overlap with the collection bus bars 38 and the lengths of the inner side bus bars 36 that overlap with the collection bus bars 38 satisfy the relationship $\Sigma Di > (E1+E2)/2$.

Hereabove, the battery cooling structure 10 according to the present exemplary embodiments has been described in accordance with the attached drawings. However, the battery cooling structure 10 according to the present exemplary embodiments is not limited to the illustrated structures; suitable design modifications may be applied within a scope not departing from the gist of the present disclosure. For example, the inner side bus bars 34 and inner side bus bars 36 may be supported by the support portions 48 at the lower side and the collection bus bars 38 may be supported by the support portions 46 at the upper side.

In the first exemplary embodiment, the negative bus bar 18 of the one cell group 22A and the positive bus bar 16 of the another cell group 22B may be supported by the shared brackets 40 that are formed with a hat shape in cross section. In this structure, in addition to the effects described above, contact between the negative bus bar 18 of the one cell group 22A and the side walls 24Sf of the another cell group 22B, and contact between the positive bus bar 16 of the another cell group 22B and the side walls 24Sr of the one cell group 22A may be prevented by the brackets 40.

The battery 20 and the battery cooling structure 10 according to the present exemplary embodiments are not limited to modes of application to electric cars. The battery 20 and the battery cooling structure 10 according to the present exemplary embodiments are applicable to hybrid cars, plug-in hybrid cars and the like, and to vehicles in general that employ electric motors for driving running.

What is claimed is:

1. A battery cooling structure for a vehicle, the structure comprising:
   a battery including a plurality of cell groups arrayed in a vehicle body front-rear direction, wherein:
   each cell group includes a plurality of cuboid cells that are arrayed in a thickness direction of the cells,
   each cell includes a positive terminal provided at one side wall extending in a short side direction of the cell and a negative terminal provided at another side wall extending in the short side direction,
   the positive terminals of one of the cell groups and the negative terminals of another of the cell groups, which cell groups are adjacent in the vehicle body front-rear direction, oppose one another in a plan view,
   the negative terminals of the one of the cell groups and the positive terminals of the other of the cell groups oppose one another in the vehicle body front-rear direction, and the negative terminals of the one of the cell groups and the positive terminals of the other of the cell groups are offset in a vertical direction,
   a first positive bus bar electrically connects the positive terminals of alternating cells in the one of the cell groups, wherein the first positive bus bar extends in the vehicle body front-rear direction,
   a first negative bus bar electrically connects the negative terminals of alternating cells in the one of the cell groups, wherein the first negative bus bar extends in the vehicle body front-rear direction,
   a second positive bus bar electrically connects the positive terminals of alternating cells of the other of the cell group, wherein the second positive bus bar extends in the vehicle body front-rear direction,
   a second negative bus bar electrically connects the negative terminals of alternating cells of the other of the cell group, wherein the second negative bus bar extends in the vehicle body front-rear direction,
   a cooling plate, wherein a side wall of each of the cells that extends in a long side direction of the cell, and that forms the cell groups, contacts the cooling plate, and
   a shared bracket in physical contact with the cooling plate, wherein the shared bracket comprises:
   a first sidewall,
   a second sidewall,
   a first support portion extends from the first sidewall toward the second sidewall, wherein the first support portion is configured to support the first positive bus bar, and
   a second support portion extending from the second sidewall toward the first sidewall, wherein the second support portion is configured to support the first negative bus bar, and the first support portion is offset from the second support portion in the vertical direction.

2. A battery cooling structure for a vehicle, the structure comprising:
   a battery including a plurality of cell groups arrayed in a vehicle body front-and-rear direction, each cell group including a plurality of cuboid cells that are arrayed in a thickness direction of the cells, each cell including a positive terminal provided at one side wall extending in a short side direction of the cell and a negative terminal provided at another side wall extending in the short side direction, and a side wall of each of the cells that extends in a long side direction of the cell, and that forms the cell groups, contacting a cooling plate;
   negative terminal of one of the cell groups and positive terminals of another of the cell groups oppose one another in the vehicle body front-rear direction, and the negative terminals of the one of the cell groups and the positive terminals of the other of the cell groups are offset in a vertical direction,
   a first positive bus bar electrically connects the positive terminals of alternating cells in the one of the cell groups, wherein the first positive bus bar extends in the vehicle body front-rear direction,
   a first negative bus bar electrically connects the negative terminals of alternating cells in the one of the cell groups, wherein the first negative bus bar extends in the vehicle body front-rear direction,
   a second positive bus bar electrically connects the positive terminals of alternating cells of the other of the cell group, wherein the second positive bus bar extends in the vehicle body front-rear direction,
   a second negative bus bar electrically connects the negative terminals of alternating cells of the other of the cell group, wherein the second negative bus bar extends in the vehicle body front-rear direction,
   wherein a side wall of each of the cells that extends in a long side direction of the cell, and that forms the cell groups, contacts the cooling plate, and
   a shared bracket in physical contact with the cooling plate, wherein the shared bracket comprises:
   a first sidewall,
   a second sidewall,
   a first support portion extends from the first sidewall toward the second sidewall, wherein the first support portion is configured to support the first positive bus bar, and
   a second support portion extending from the second sidewall toward the first sidewall, wherein the second support portion is configured to support the first negative bus bar, and the first support portion is offset from the second support portion in the vertical direction.

3. The battery cooling structure for a vehicle according to claim 1, further comprising:
   a third positive bus bar electrically connecting the positive terminals of alternating cells of the one of the cell groups that are not connected by the first positive bus bar, wherein the third positive bus bar extends in the vehicle front-rear direction.

4. The battery cooling structure for a vehicle according to claim 3, wherein the first positive bus bar is on an opposite side of the one of the cell groups from the third positive bus bar.

5. The battery cooling structure for a vehicle according to claim 1, further comprising:
a third negative bus bar electrically connecting the negative terminals of alternating cells of the one of the cell groups that are not connected by the first negative bus bar, wherein the third negative bus bar extends in the vehicle front-rear direction.

6. The battery cooling structure for a vehicle according to claim 5, wherein the first negative bus bar is on an opposite side of the one of the cell groups from the third negative bus bar.

7. The battery cooling structure for a vehicle according to claim 1, further comprising:
a third positive bus bar electrically connecting the positive terminals of alternating cells of the other of the cell groups that are not connected by the first positive bus bar, wherein the third positive bus bar extends in the vehicle front-rear direction.

8. The battery cooling structure for a vehicle according to claim 7, wherein the first positive bus bar is on an opposite side of the other of the cell groups from the third positive bus bar.

9. The battery cooling structure for a vehicle according to claim 1, further comprising:
a third negative bus bar electrically connecting the negative terminals of alternating cells of the other of the cell groups that are not connected by the first negative bus bar, wherein the third negative bus bar extends in the vehicle front-rear direction.

10. The battery cooling structure for a vehicle according to claim 9, wherein the first negative bus bar is on an opposite side of the other of the cell groups from the third negative bus bar.

11. The battery cooling structure for a vehicle according to claim 2, further comprising:
a third positive bus bar electrically connecting the positive terminals of alternating cells of the one of the cell groups that are not connected by the first positive bus bar, wherein the third positive bus bar extends in the vehicle front-rear direction.

12. The battery cooling structure for a vehicle according to claim 11, wherein the first positive bus bar is on an opposite side of the one of the cell groups from the third positive bus bar.

13. The battery cooling structure for a vehicle according to claim 2, further comprising:
a third negative bus bar electrically connecting the negative terminals of alternating cells of the one of the cell groups that are not connected by the first negative bus bar, wherein the third negative bus bar extends in the vehicle front-rear direction.

14. The battery cooling structure for a vehicle according to claim 13, wherein the first negative bus bar is on an opposite side of the one of the cell groups from the third negative bus bar.

15. The battery cooling structure for a vehicle according to claim 2, further comprising:
a third positive bus bar electrically connecting the positive terminals of alternating cells of the other of the cell groups that are not connected by the first positive bus bar, wherein the third positive bus bar extends in the vehicle front-rear direction.

16. The battery cooling structure for a vehicle according to claim 15, wherein the first positive bus bar is on an opposite side of the other of the cell groups from the third positive bus bar.

17. The battery cooling structure for a vehicle according to claim 2, further comprising:
a third negative bus bar electrically connecting the negative terminals of alternating cells of the other of the cell groups that are not connected by the first negative bus bar, wherein the third negative bus bar extends in the vehicle front-rear direction, wherein the first negative bus bar is on an opposite side of the other of the cell groups from the third negative bus bar.

* * * * *